United States Patent [19]
Kanayama

[11] Patent Number: 4,760,408
[45] Date of Patent: Jul. 26, 1988

[54] COLOR INK JET SYSTEM PRINTER

[75] Inventor: Yoshio Kanayama, Nabari, Japan

[73] Assignee: Sharp Kabushiki Kaisha, Osaka, Japan

[21] Appl. No.: 947,421

[22] Filed: Dec. 29, 1986

Related U.S. Application Data

[63] Continuation of Ser. No. 488,827, Apr. 26, 1983, abandoned.

[30] Foreign Application Priority Data

Apr. 29, 1982 [JP] Japan .................................. 57-71690

[51] Int. Cl.[4] .......................... G01D 15/18; B41J 3/20
[52] U.S. Cl. ................................ 346/140 R; 400/126
[58] Field of Search ..................... 346/140 R; 400/126

[56] References Cited

U.S. PATENT DOCUMENTS

| | | | |
|---|---|---|---|
| 4,313,684 | 2/1982 | Tazaki et al. | 400/322 |
| 4,412,225 | 10/1983 | Yoshida et al. | 346/1.1 |
| 4,433,338 | 2/1984 | Nakagawa et al. | 346/34 |

*Primary Examiner*—E. A. Goldberg
*Assistant Examiner*—Gerald E. Preston
*Attorney, Agent, or Firm*—Birch, Stewart, Kolasch & Birch

[57] ABSTRACT

A color ink jet system printer of the ink on demand type includes at least three orifices for different ink colors aligned in a lateral direction. A carriage is driven to shift in the lateral direction so that the ink droplets emitted from the respective orifices reach a desired picture element at different timings, thereby mixing colors to perform the multi-color printing.

1 Claim, 9 Drawing Sheets

| ORIFICE NUMBER | NEGATE CONDITION ADDRESS |
|---|---|
| Y 1 | above 040 |
| Y 2 | 03F, above 080 |
| Y 3 | 07E, 07F, above 0C0 |
| Y 4 | 0BD~0BF, above 100 |
| M 1 | 0FC~0FF, above 140 |
| M 2 | 13B~13F, above 180 |
| M 3 | 17A~17F, above 1C0 |
| M 4 | 1B9~1BF, above 200 |
| C 1 | 1F8~1FF, above 240 |
| C 2 | 237~23F, above 280 |
| C 3 | 276~27F, above 2C0 |
| C4 | 2B5~2BF, above 300 |
| B1 | 2F4~2FF, above 340 |
| B2 | 333~33F, above 380 |
| B3 | 372~37F, above 3C0 |
| B4 | 3B1~3BF, |

COLOR INK JET SYSTEM PRINTER

This application is a continuation of application Ser. No. 488,827, filed on Apr. 26, 1983, abandoned.

BACKGROUND AND SUMMARY OF THE INVENTION

The present invention relates to a printer for printing a color image and, more particularly, to an ink jet system printer of the ink-on-demand type for printing a color image.

Generally, in a color printer, various colors are formed by mixing three primary colors, yellow, magenta and cyan. A color ink jet system printer has been proposed, wherein the above-mentioned three color ink droplets are emitted from a printer head, and the color ink droplets are mixed on record receiving paper.

In the conventional color ink jet system printer of the ink-on-demand type, a plurality of orifices of different colors are directed to a single picture element position. This complicates the printer construction and, therefore, the conventional color on-demend ink jet system printer is not suited for multi-orifice construction.

In another conventional ink-on-demand color printer, a plurality of orifices of different colors are vertically aligned. In one type, a record receiving paper or a printer head is shifted in the vertical direction for each picture element in order to mix the different colors. This complicates the mechanism for driving the printer head of the record receiving paper. In another type, a first color is first printed by one line then a second color is printed on the same line after the printer head is returned to the initial position. This control lengthens a time period between the depositions of the first and second color droplets and, therefore, the colors are not properly mixed.

Accordingly, an object of the present invention is to provide a novel control system in a multi-orifice ink-on-demand ink jet system printer for printing a color image.

Another object of the present invention is to simplify construction of a color ink jet system printer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a plurality of orifices of different colors are aligned in the horizontal direction on a printer head with a predetermined distance therebetween, and a control circuit functions to emit the ink droplets from the respective orifices at a preferred interval while the printer head travels in the horizontal direction.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 5, 6, 6(A), 6(B) and 6(C) are flow charts for explaining an operational mode of the control system of FIG. 4;

DESCRIPTION OF THE PREFERRED EMBODIMENTS

Figure 1:
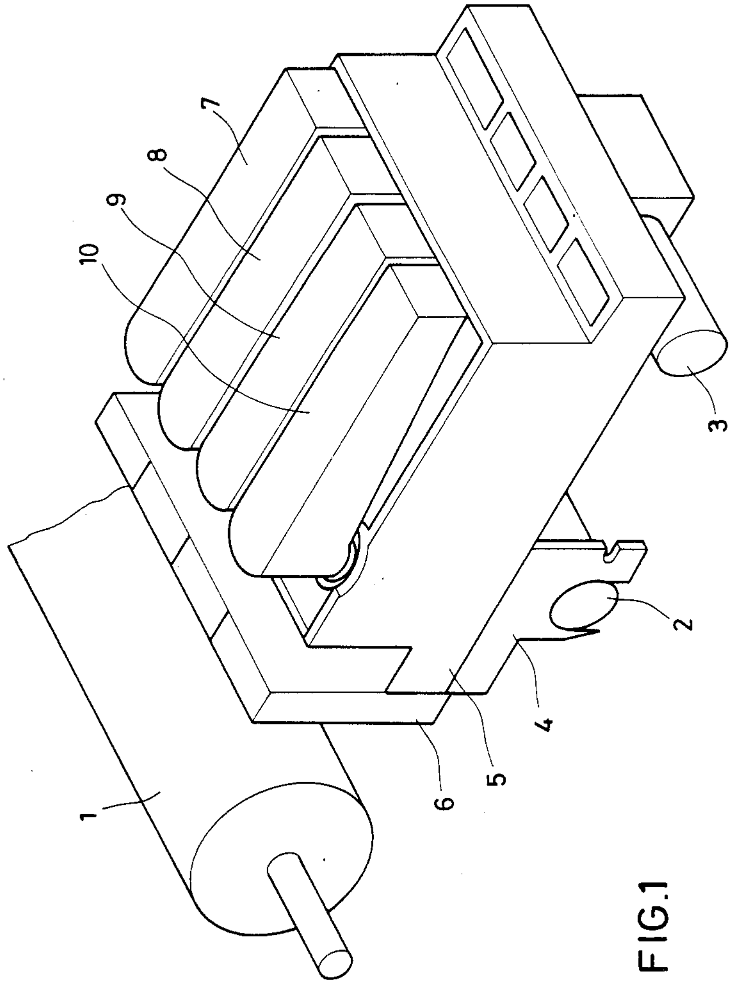
FIG. 1 is a schematic perspective view of an embodiment of a color ink jet system printer of the present invention.

FIG. 1 schematically shows an embodiment of a color ink jet system printer of the present invention, which includes a platen 1, and a pair of shafts 2 and 3 disposed along the platen 1. A carriage 4 is slidably mounted on the shafts 2 and 3 so that the carriage 4 is slidable along the platen 1 in the lateral direction. The carriage 4 is connected to a drive mechanism including a pulse motor via a wire, whereby the carriage 4 is driven to travel in the lateral direction by the pulse motor. The actual printing operation is conducted while the carriage 4 travels rightwards in FIG. 1.

Four ink reservoirs 5 containing ink of four different colors, respectively, are mounted on the carriage 4. A printer head 6 is mounted on the carriage 4 in such a manner that the printer head 6 confronts the platen 1 and communicates with the four ink reservoirs 5. Four ink cartridges 7, 8, 9 and 10 are mounted on the four ink reservoirs 5. The ink cartridge 7 contains yellow ink, the ink cartridge 8 contains magenta ink, the ink cartridge 9 contains cyan ink, and the ink cartridge 10 containes black ink.

Figure 2:
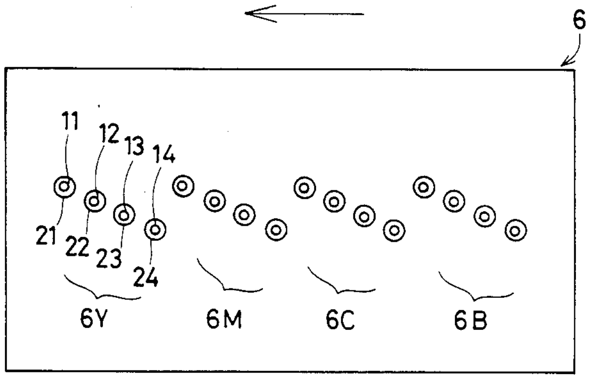
FIG. 2 is a schematic front view of a printer head included in the color ink jet system printer of FIG. 1.

FIG. 2 is a front view of the printer head 6. An arrow in FIG. 2 represents the travel direction of the carriage 4 while the actual printing operation is conducted. The printer head 6 includes four yellow orifices 6Y, four magenta orifices 6M, four cyan orifices 6C, and four black orifices 6B. Orifices 11, 12, 13 and 14 for each color are disposed in a manner to incline diagonally as shown in FIG. 2. The distance between the two adjacent orifices in the vertical direction corresponds to the length of four dot positions. The distance between the two adjacent orifices in the lateral direction corresponds to the length of eight dot positions. The corresponding orifices of the respective color are located at the same line. Reference numerals 21, 22, 23 and 24 represent slit openings for the orifices 11, 12, 13 and 14, respectively.

Figure 3:
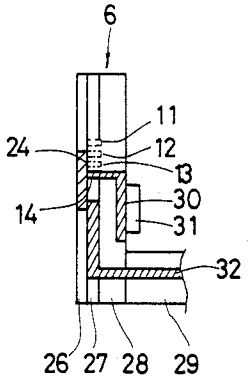
FIG. 3 is a sectional view of the printer head of FIG. 2.

FIG. 3 shows an essential part of the printer head 6. The printer head 6 is essentially made of stainless steel plates 26, 27, 28 and 29, which are shaped in a desired configuration through the use of an etching method and connected to each other through the use of a welding method.

The orifice 14 communicates with a pressure chamber 30 to which a vibrator 31 is secured. The stainless steel plate 26 includes the slit opening 24 which is positioned in front of the orifice 14. The slit opening 24 is connected to the ink reservoir 5 via a conduit 32 formed in the plates 27, 28 and 29. In FIG. 3, the hatched portion represents the ink. A similar construction is provided for the remaining orifices 11, 12 and 13, and the respective slit openings 21, 22, 23 and 24 commonly communicate with the conduit 32 for introducing the yellow ink. It will be clear that the same construction is provided for the remaining orifices for the magenta ink, the cyan ink, and the black ink.

When the vibrator 31 is energized, the volume of the pressure chamber 30 is reduced to push ink through the orifice 14 to the slit opening 24, thereby emitting an ink droplet toward record receiving paper disposed around the platen 1.

Figure 4:
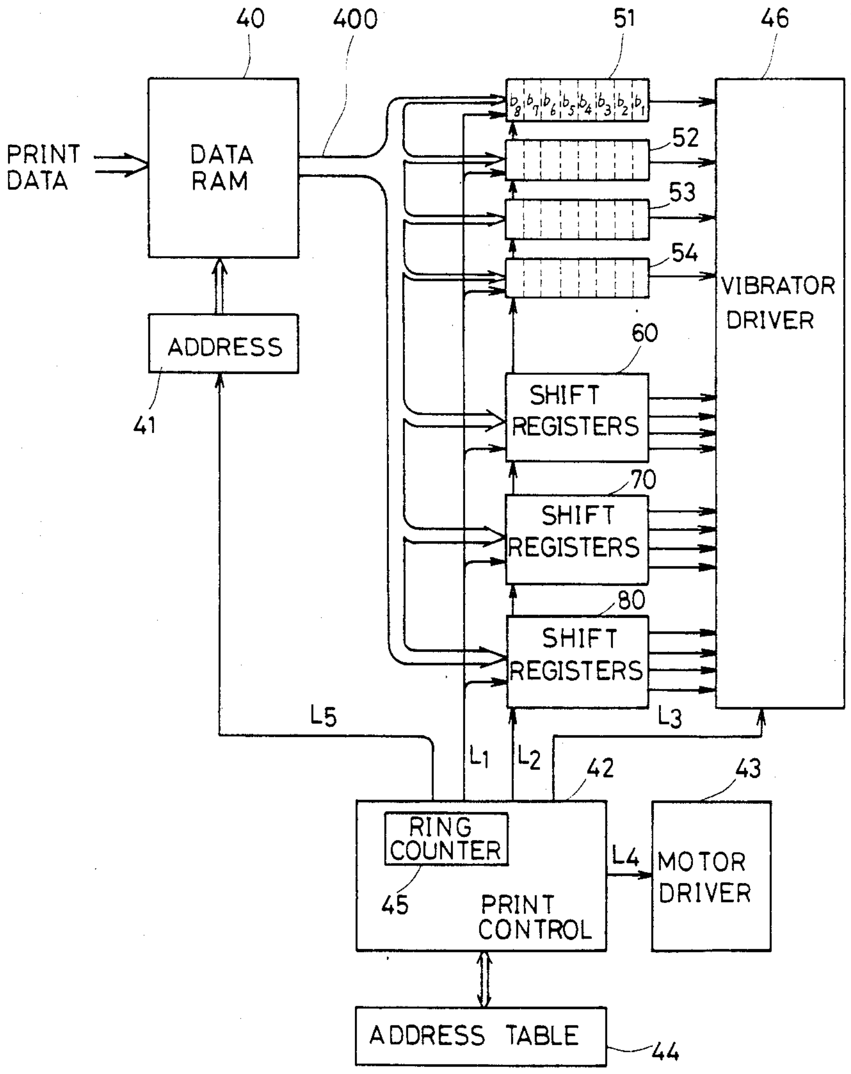
FIG. 4 is a block diagram of a control system for the color ink jet system printer of FIG. 1.

FIG. 4 shows a control system for controlling operations of the color ink jet system printer of FIG. 1, which includes a data memory (RAM) 40 for memorizing the print data.

Figures 7, 8:
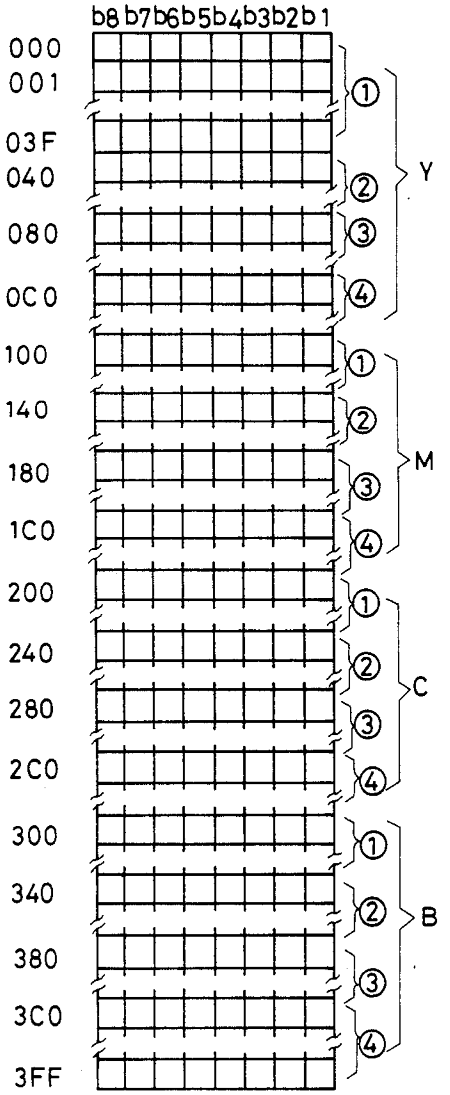
FIG. 7 is a schematic view showing a construction of a data memory included in the control system of FIG. 4.
FIG. 8 is a schematic view showing an address table for controlling an operation of the control system of FIG. 4.

The data memory 40 stores the print data ("1" for the printing dot, and "0" for the non-printing dot) for the respective four colors. More specifically, the data memory 40 includes four memory areas assigned to the respective colors, each area being divided into four sections assigned to the respective orifices as shown in FIG. 7. The yellow area Y includes a first section (addresses "000" through "03F") associated with the first orifice 6Y11, and second section (addresses "040" through "07F") associated with the second orifice 6Y12, a third section (addresses "080" through "0BF") associated with the third orifice 6Y13, and a fourth section (addresses "0C0" through "0FF") associated with the fourth orifice 6Y14. The magenta area M includes a first section (addresses "100" through "13F") associated with the first orifice 6M11, a second section (addresses "140" through "17F") associated with the second orifice 6M12, a third section (addresses "180" through "1BF") associated with the third address 6M13, and a fourth section (addresses "1C0" through "1FF") associated with the fourth orifice 6M14. The cyan area C includes a first section (addresses "200" through "23F") associated with the first orifice 6C11, a second section (addresses "240" through "27F") associated with the second orifice 6C12, a third section (addresses "280" through "2BF") associated with the third orifice 6C13, and a fourth section (addresses "2C0" through "2FF") associated with the fouth orifice 6C14. The black area B includes a first section (addresses "300" through "33F") associated with the first orifice 6B11, a second section (addresses "340" through "37F") associated with the second orifice 6B12, a third section (addresses "380" through "3BF") associated with the third orifice 6B13, and a fourth section (addresses "3C0" through "3FF") associated with the fourth orifice 6B14. That is, the data memory 40 is divided into four memory sections. Each of the memory sections has 512 bits which correspond to the number of picture elements included in one line. Each of the addresses consists of eight bits (on byte) for storing the print data for eight picture elements. In each of the addresses in FIG. 7, b1 represents the first bit.

The thus constructed data memory 40 is connected to an address circuit 41 which is controlled by a print control circuit 42 in order to develop a desired print data at a desird time on an output data bus 400. The output data bus 400 is connected to shift registers 51, 52, 53, 54, 60, 70 and 80 which are implemented by a RAM. The shift registers 51, 52, 53 and 54 store the print data associated with the yellow printing. The shift register 60 includes four registers such as the registers 51, 52, 53 and 54, and the shift register 60 stores the print data associated with the magneta printing. The shift register 70 includes four shift registers as the shift register 60 for storing the print data related to the cyan printing. The shift register 80 includes four shift registers as the shift register 60 for storing the print data related to the black printing.

The shift register 51 has an eight bit capacity, and functions to introduce, in a parallel fashion, the eight bit print data from the data memory 40 in response to a control signal L1 developed from the print control circuit 42. The print data stored in the shift register 51 is shifted in response to a clock signal L2 developed from the print control circuit 42, and serially applied to a vibrator driver circuit 46. The shift register 51 stores the print data related to the first orifice 6Y11 of the yellow printing.

The sift register 52 operates in a same manner as the shift register 51. The shift register 52 stores the print data related to the second orifice 6Y12 of the yellow printing. Similarly, the shift registers 53 and 54 store the print data related to the third and fourth orifices 6Y13 and 6Y14 of the yellow printing, respectively.

The vibrator driver circuit 46 includes 16 drivers for driving each of the vibrators associated with each of the 16 orifices. If a data "1" is applied from the corresponding shift register to the driver, the driver functions to energize the corresponding vibrator in response to a pulse signal L3 developed from the print control circuit 42.

The control system of FIG. 4 further includes a motor driver circuit 43 for rotating the pulse motor connected to the carriage 4 in response to a pulse signal L4 developed from the print control circuit 42. An address table 44 implemented with a ROM is connected to the print control circuit 42 for conducting a judge operation. The actual printing operation is conducted in accordance with the negate conditions (shown in FIG. 8) memorized in the address table 44, which determine the actual printing operation in accordance with the address data of the data memory 40.

The print control circuit 42 includes an eight-bit ring counter 45. The print control circuit 42 develops the control signals L1 through L5 for controlling the system operation as shown in the flow charts of FIGS. 5, 6, 6(A), 6(B) and 6(C).

An operational mode of the control system of FIG. 4 will be described with reference to FIGS. 5, 6, 6(A), 6(B) and 6(C).

Figure 5:
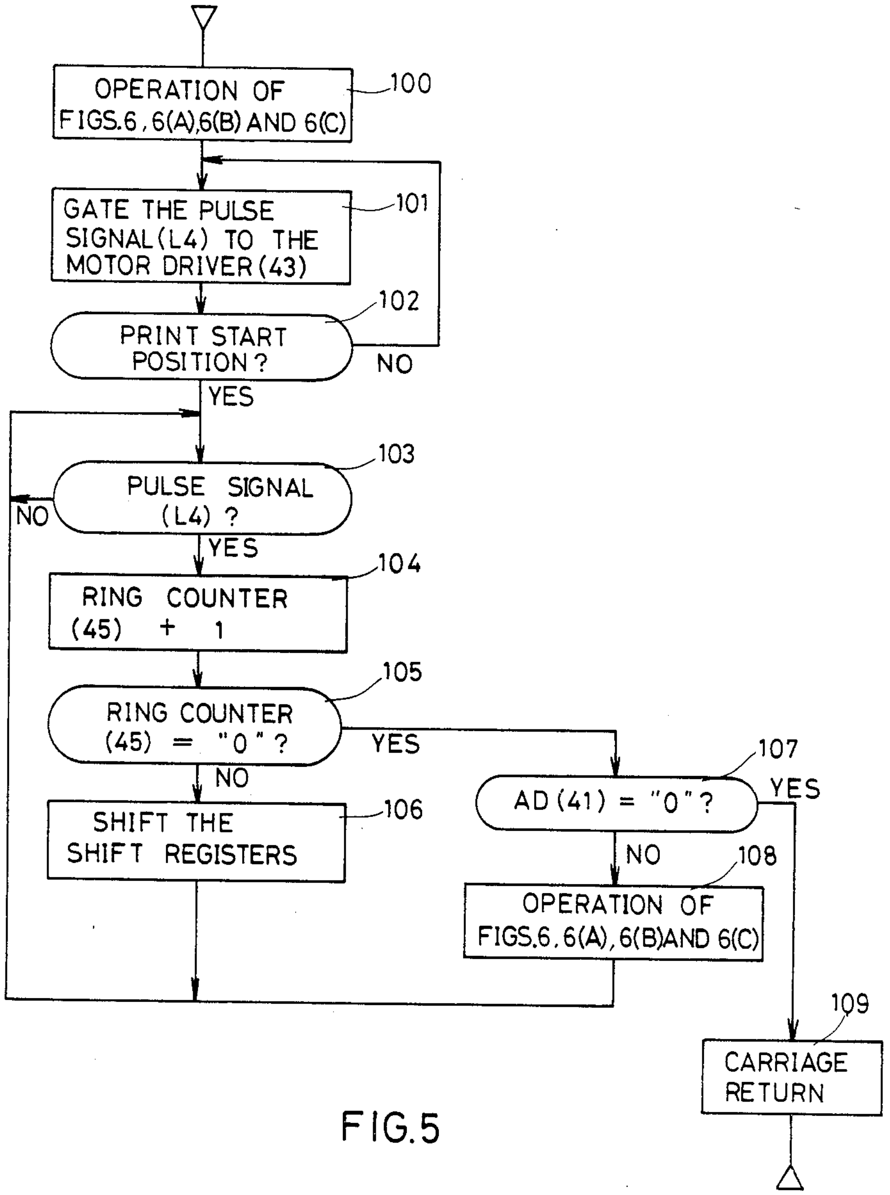
Figure 6:
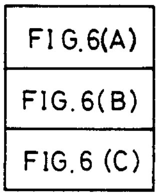
Figure 6A:
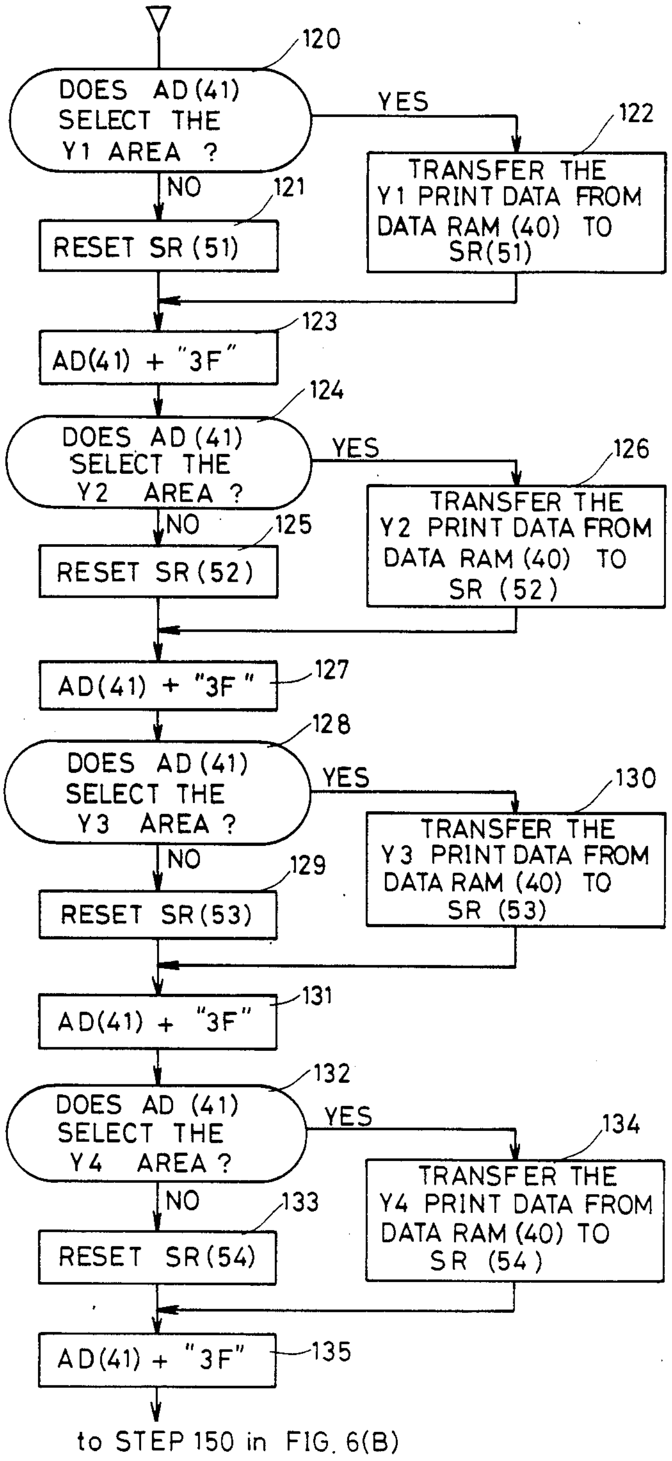
Figure 6B:
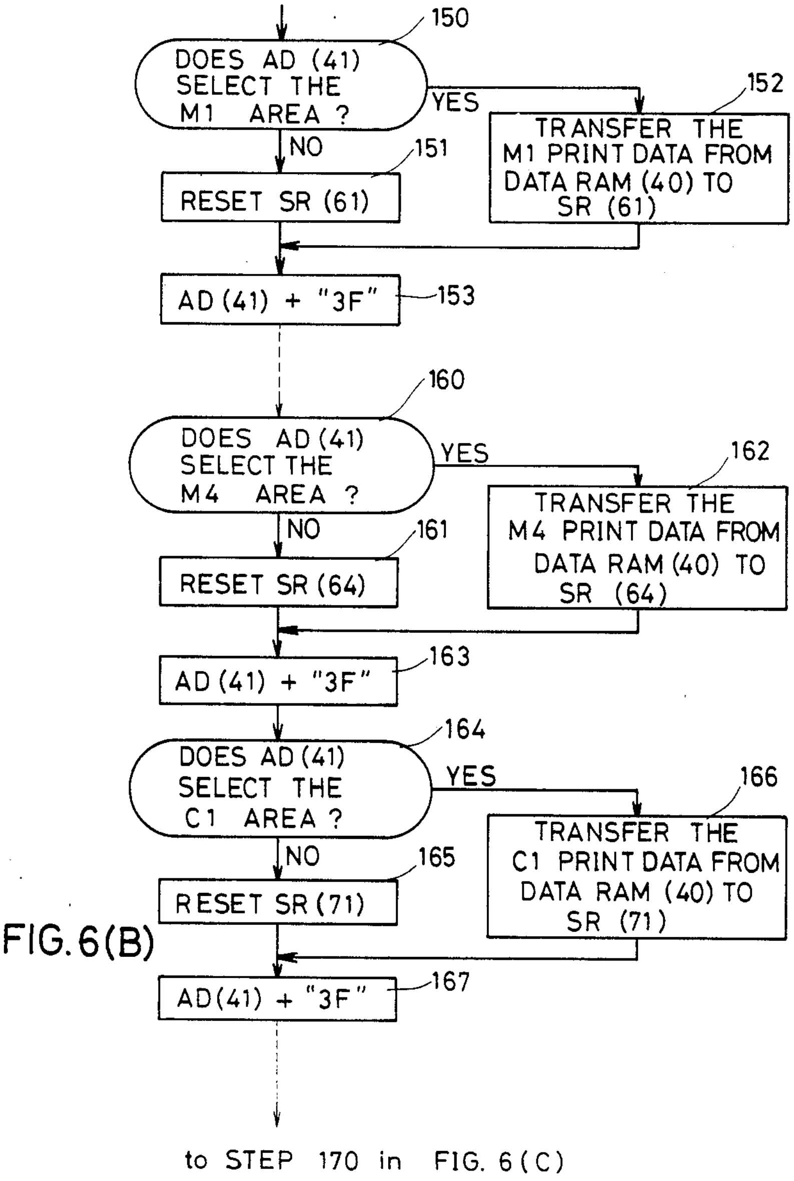
Figure 6:
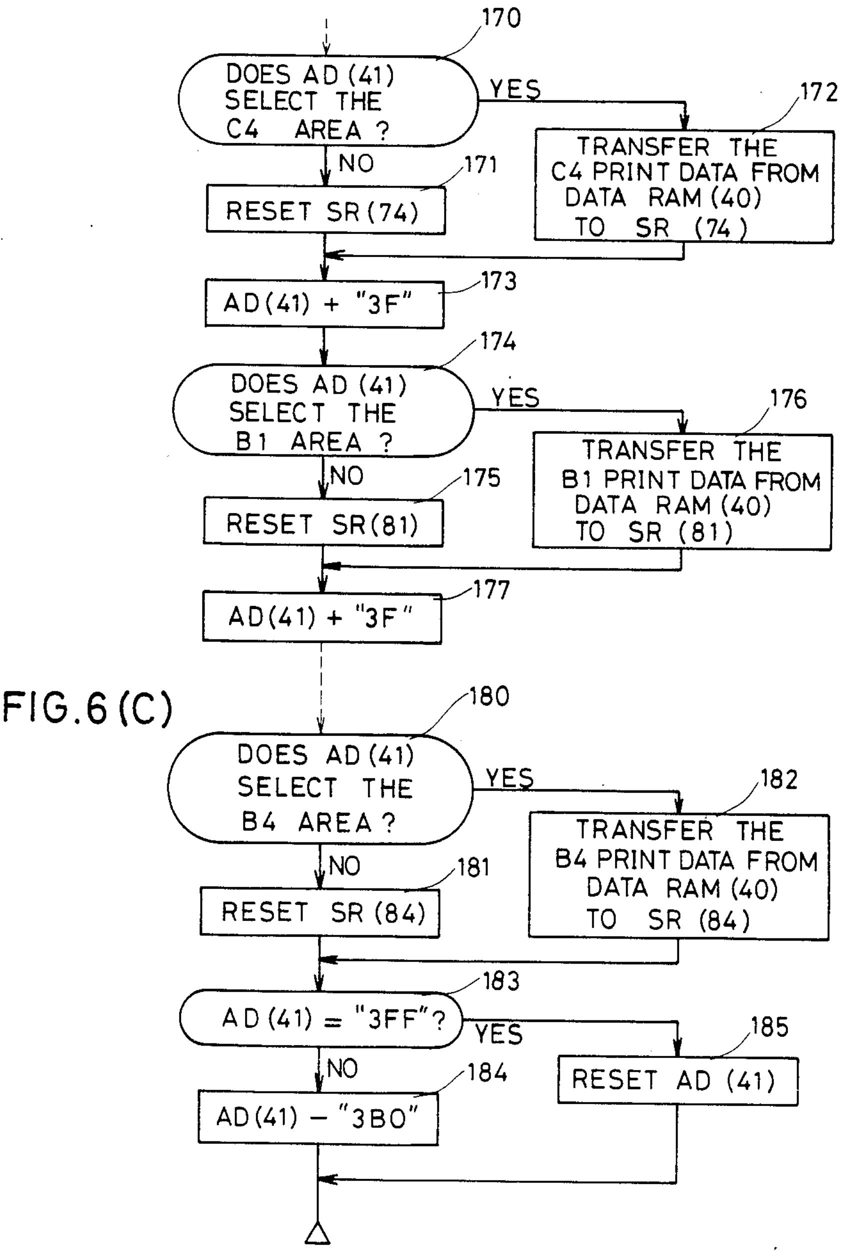

Now assume that the print data is applied from the main processing system to the ink jet system printer and stored in the data memory 40 before initiating the printing operation. The printing operation is conducted in accordance with the programs shown in FIG. 5. Step 100 in FIG. 5 is shown in FIGS. 6, 6(A), 6(B) and 6(C), which function to place the ink jet system printer in its initial condition.

The address circuit (AD) 41 is first in the reset state to address the "000" area in the data memory 40. At step 120, the Y1 area ( related to the yellow first orifice 6Y11) is selected. The selected address is not included in the negate conditions stored in the address table 44 (see FIG. 8). Accordingly, the operation is advanced to step 122 at which the print data stored in the "000" area of the data memory 40 (8 bit (1 bite) data) is transferred to the shift register (SR) 51. Then, the address circuit (AD) 41 is increased by "3F" at step 123.

That is, the address circuit (AD) 41 selects the area of the address "03F" which is next before the Y2 area. At the following step 124, a determination is carried out to detect whether the present address data shows the Y2 area (related to the second yellow orifice 6Y12). However, the address "03F" belongs to the negate conditions stored in the address table 44 (see FIG. 8) and, therefore, the operation is advanced to step 125 to reset the shift register (SR) 52. By conducting steps 127 through 181, every shift register except for shift register (SR) 51 is reset, and the shift register (SR) 51 stores the print data which has been stored in the area "000" of the data memory 40.

When the operation is advanced to step 183, the address circuit (AD) 41 stores the address data ("3C0"−15), which is "3B1" before the fourth black area B4. Therefore, the condition AD="3FF" (the last address) is not satisfied to advance the operation to step 184 at which the data "3B0" is subtracted from the present address data "3B1". The data "3B0" corresponds to ("03F"×15)−1. At this moment, the address data stored in the address circuit (AD) 41 becomes "001" which selects the second address in the Y1 area.

Then, the operation is advanced to step 101 in FIG. 5 to activate the pulse motor driver circuit 43, whereby the carriage 4 is driven to travel to the right at a predetermined velocity. When the carriage 4 reaches the print starting position (left margin), the operation is advanced from step 102 to step 103 to wait for the following pulse applied to the motor driver circuit 43. In response to the pulse signal applied to the motor driver circuit 43, the carriage 4 is shifted to the first dot printing position, and the contents stored in the ring counter 45 are increased by one at step 104. At this moment, the contents stored in the ring counter 45 are not zero and, therefore, the operation is advanced from step 105 to step 106 to develop the clock signal L2 for conducting the shift operation of the shift registers 51, 52, 53, 54, 60, 70 and 80. In response to the shift operation, the first bit (b1) data stored in the shift registers 51, 52, 53, 54, 60, 70 and 80 is applied to the vibrator driver circuit 46 in a parallel fashion. When the pulse signal L3 is applied to the vibrator driver circuit 46, the vibrators related to the data "1" are activated to emit the ink droplets from the corresponding orifices.

The above-mentioned steps 103 through 106 are repeated to sequentially develop the data from the shift registers to the vibrator driver circuit 46 for conducting the printing operation. When the eight bit data (b1 through b8) is developed from the shift registers, the contents stored in the ring counter 45 become zero to advance the operation from step 105 to step 107 at which the address data stored in the address circuit (AD) 41 is checked to determined whether AD ="0". At this moment, since the address circuit (AD) 41 stores the address data "001", the operation is advanced to step 108 to conduct the operation of FIGS. 6, 6(A), 6(B) and 6(C).

The operation of FIGS. 6, 6(A), 6(B) and 6(C) is conducted during a period before the next pulse signal L2 is developed. At this moment, the print data stored in the area "001" of the data memory 40 is applied to the shift register 51, and the print data stored in the area "040" of the data memory 40 is applied to the shift register 52. Then, the operation of FIG. 5 is conducted. That is, at this moment, the first yellow orifice 6Y11 and the second yellow orifice 6Y12 are subject to printing.

Figure 9:
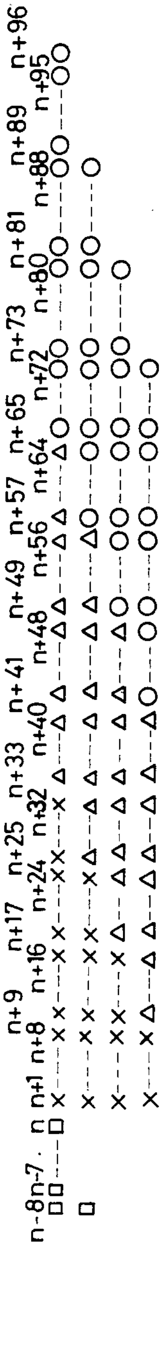
FIG. 9 is a schematic plan view for explaining a printing operation conducted by the color ink jet system printer of FIG. 1.

In this way, the printing operation is initiated in the order of 6Y11, 6Y12, 6Y13, 6Y14, 6M11, 6M12, 6M13, 6M14, 6C11, 6C12, 6C13, 6C14, 6B11, 6B12, 6B13, and 6B14. the printing initiation timing is delayed by eight bit picture elements between the adjacent orifices. Accordingly, the actual three color printing is conducted from the time which corresponds to the 89th dot position printing. In the color ink jet system printer of the present invention, the black color printing is conducted in addition to the yellow, magenta and cyan color printing. FIG. 9 shows a print timing for conducting the four color printing. In FIG. 9, the symbol ○ represents points at which only the yellow printing has been conducted. The symbol Δ represents points at which the yellow and magenta printing has been conducted. The symbol x represents points at which the yellow, magenta and cyan printing has been carried out. The symbol □ represents points at which the black printing has been conducted. In this embodiment, the black printing is conducted instead of mixing three colors. FIG. 9 shows a condition where the first yellow orifice 6Y11 is located at the (n+96)th dot position.

It will be clear that the present color ink jet system printer can easily perform the single color printing. If the black color printing only is required, the print data is only introduced into the black area of the data memory 40, and the data "0" is applied to the remeining areas Y, M and C.

When the carriage 4 is near the right margin, the negate conditions of the respective orifices are sequentially satisfied to reset the corresponding shift registers. More specifically, when the orifice 6Y11 exceeds the right margin, the contents stored in the address circuit 41 become greater than "040", which satisfy the negate conditions memorized in the address table 44. Accordingly, the operation is advanced from step 120 to step 121 for resetting the shift register (SR) 51. When the orifice 6Y12 exceeds the right margin, the contents stored in the address circuit 41 become greater than "080", which satisfy the negate conditions memorized in the address table 44. Accordingly, the operation is advanced from the step 124 to the step 125 for resetting the shift register (SR) 52. In this way, the shift registers (SR) 51, 52, 53, 54, 61, 62, 63, 64, 71, 72, 73, 74, 81, 82, 83 and 84 are sequentially reset when the corresponding orifice exceeds the right margin. When the fourth black orifice reaches the right margin, the contents stored in the address circuit 41 become "3FF", which is detected at step 183 for resetting the address circuit (AD) 41 to "000". The reset state of the address circuit (AD) 41 is detected at step 107 to return the carriage 4 to the home position at step 109 by reversely rotating the pulse motor.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A color ink jet system printer comprising:

a carriage;

a record receiving member;

shift means for shifting at least one of said carriage or record receiving member in a lateral direction while a printing operation is conducted;

said carriage including a printer head having a plurality of orifices for emitting ink droplets of a corresponding plurality of different colors, said orifices being aligned diagonally with respect to said lateral direction with a predetermined distance in said lateral direction therebetween;

ink liquid supply means for supplying ink liquid of said different colors to said respective orifices;

print control means including ink droplet emitting means for emitting said ink droplets separately provided for each of said orifices;

drive means comprising a vibrator driver circuit including a vibrator associated with each ink droplet emitting means for energizing said respective ink droplet emitting means at predetermined times determined by said predetermined distance and a velocity of said carriage or recrod receiving means in said lateral direction for conducting a multi-color printing operation by said ink droplets emitted from said plurality of orifices;

print data memory means having a plurality of memory areas, each area corresponding to one of said plurality of orifices; and a shift register associated with each orifice of said printer head, at least one shift register being associated with each said memory area for separately transferring print data from each of said memory areas to each corresponding driver means for energizing each corresponding ink droplet emitting means at selected times, wherein each vibrator is responsive to data from a corresponding shift register.

* * * * *